Oct. 8, 1935.  J. P. MORRIS  2,016,290
MACHINE FOR CORRUGATING MATERIAL AND THREADING
TIE CORDS THROUGH THE CORRUGATIONS THEREOF
Filed April 9, 1934    3 Sheets-Sheet 3
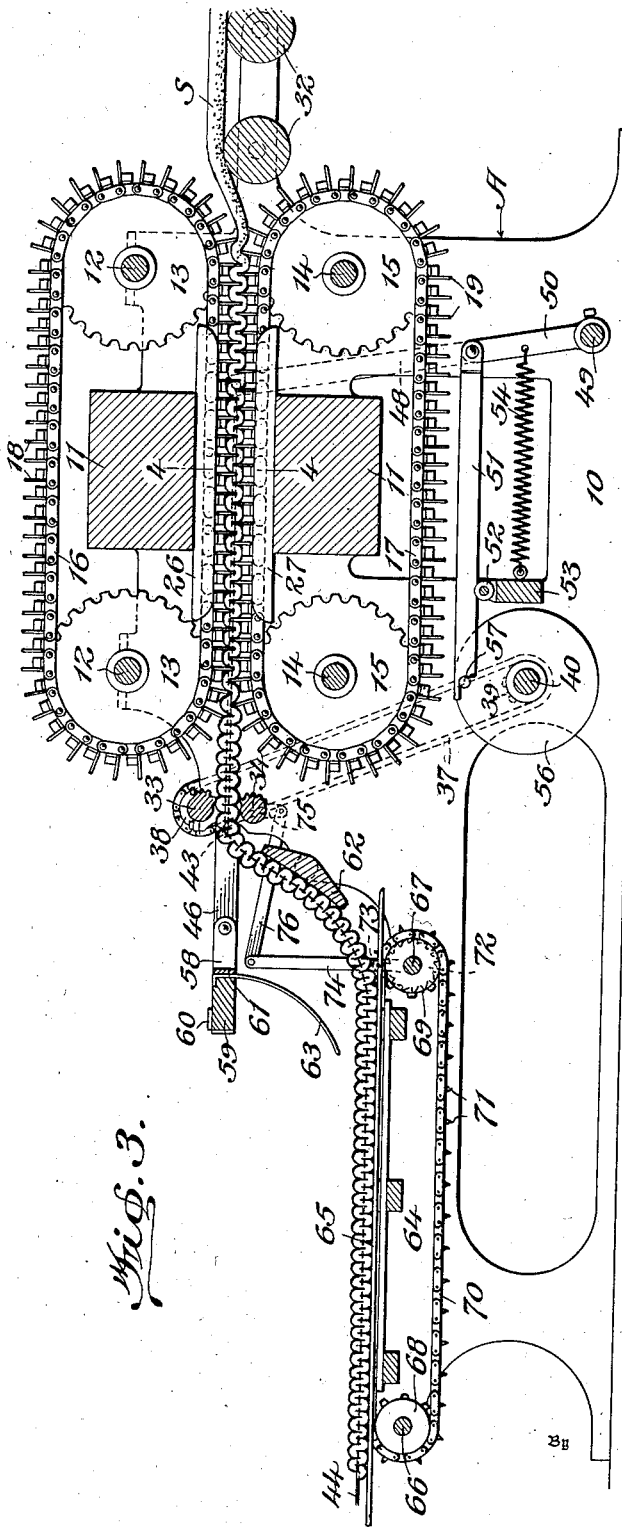
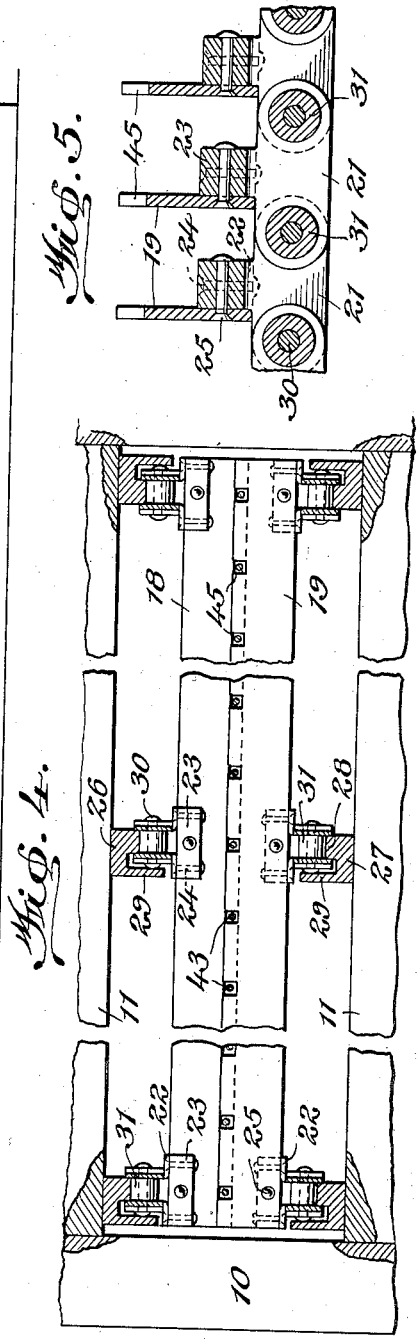
Inventor
John P. Morris,
By Carroll Bailey
Attorney Patented Oct. 8, 1935

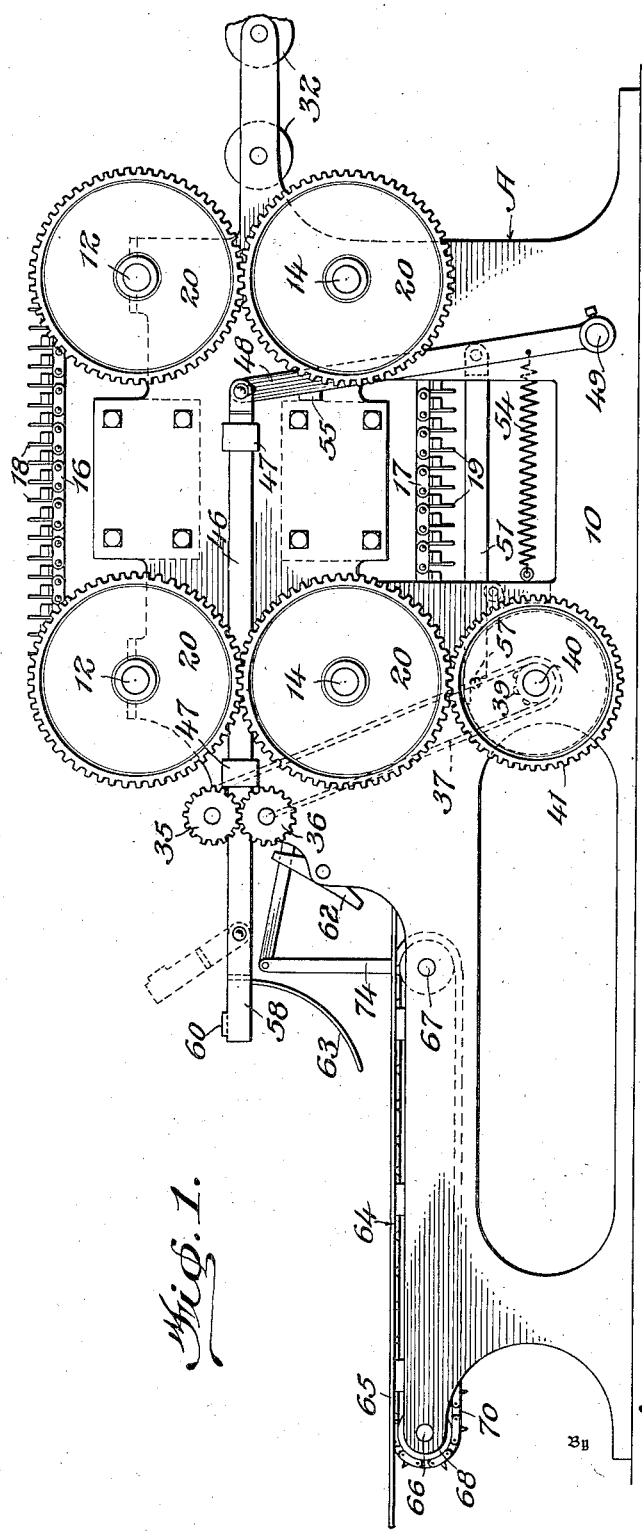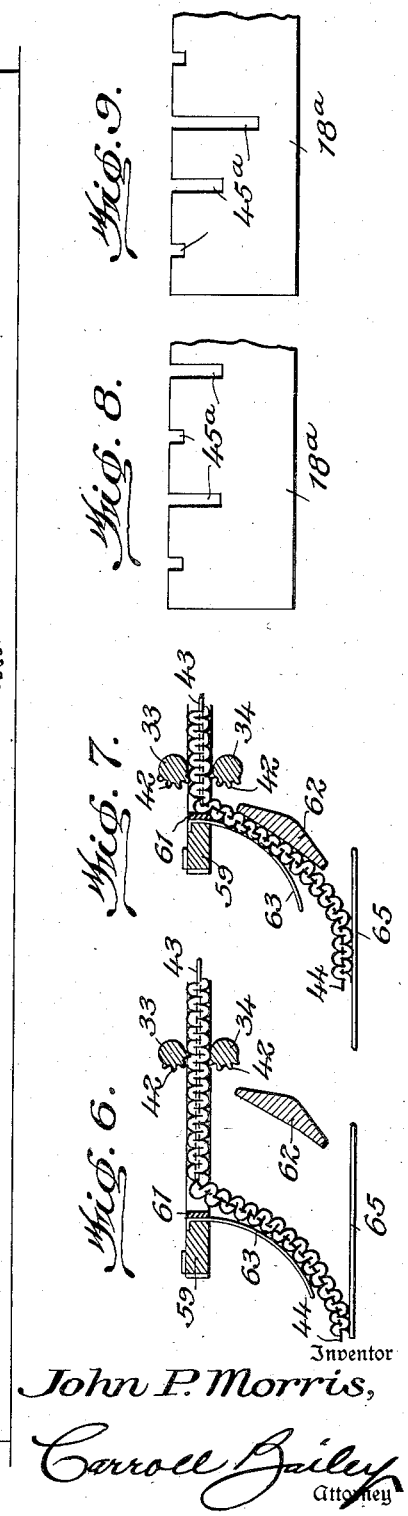

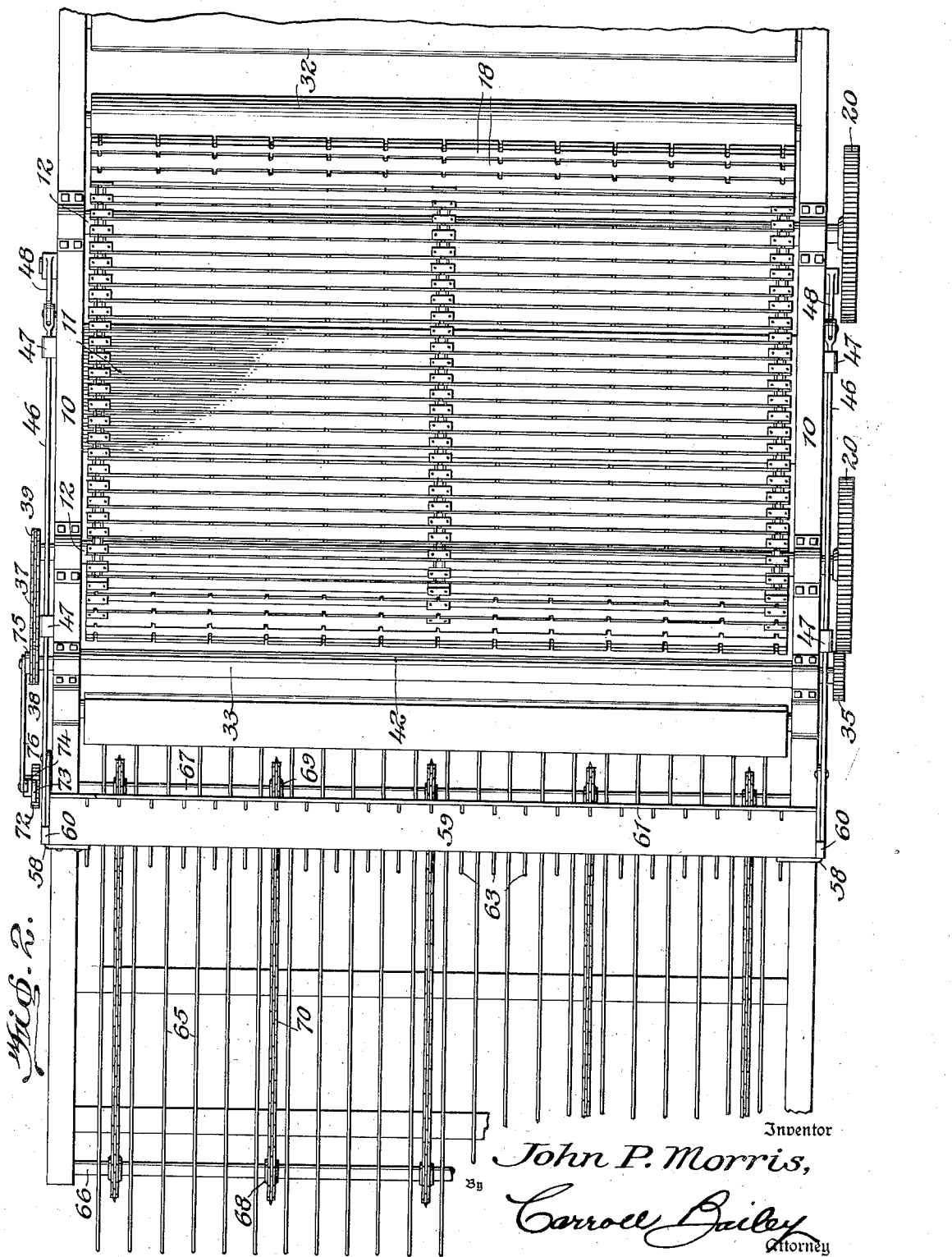

2,016,290

UNITED STATES PATENT OFFICE 2,016,290

MACHINE FOR CORRUGATING MATERIAL AND THREADING TIE CORDS THROUGH THE CORRUGATIONS THEREOF

John P. Morris, San Antonio, Tex.

Application April 9, 1934, Serial No. 719,786

22 Claims. (Cl. 112—2)

This invention relates to a machine for corrugating sheet material, and for threading tie cords transversely through the corrugations or folds of the material, whereby the corrugations or folds may be bound together to preserve the corrugated form of the material.

While there are various different uses for corrugated pads or sections of various different materials, and while the present machine is capable of corrugating various different materials and of threading tie cords through the corrugations thereof, one particular object of the invention is to provide a machine which is especially designed to corrugate materials such as cotton or wool batting and to thread tie cords therethrough for the purpose of binding such corrugated materials into pads or sections to be used as fillers for mattresses, pillows, seats and the like; such materials, when formed into corrugated pads or sections, having exceptional and lasting qualities of softness and resilience rendering them particularly desirable for purposes such as mentioned.

In my prior application, Serial No. 685,497, there is described and claimed a machine by means of which sheet material may be corrugated and tie cords may be threaded transversely through the folds or corrugations thereof. However, the machine of my prior application is not capable of continuous operation but, on the contrary, must be operated interruptedly, with consequent loss of time between the corrugating of successive sheets of material. Accordingly, another special object of the present invention is to provide a machine which is capable of continuous operation to corrugate a succession of sheets and to thread tie cords transversely through the corrugations or folds thereof, regardless of the length of the sheets. Thus, the present machine is capable of rapid and economical production because its operation need not be interrupted, since a sheet, or a succession of sheets, after being corrugated and having tie or binding cords threaded through the corrugations thereof, may be divided into pads or sections of any desired length and the corrugations of the individual sections may be bound together by the related tie cords while the machine continues in operation corrugating and threading tie cords through other sheets.

According to the present machine, needles are employed to thread the tie cords through the corrugations of the material and the needles are unsupported except by the material whereby they may be threaded continuously through the corrugations as the latter are formed, thus to permit continuous operation of the machine as aforementioned. Since the needles are unsupported except by the material, the latter, as it advances through the machine, tends to carry the needles along therewith. Accordingly, another object of the invention is to provide means whereby the needles are periodically projected or advanced counter to the direction of advance of the material, through the corrugations as the latter are formed, not only to preserve a substantially constant operative relationship between the needles and the material corrugating means, but to facilitate penetration of the corrugations by the needles.

Another object of the invention is to provide means to hold the material against advance with the needles and to, in fact, assist the corrugating means in advancing the material through the machine, whereby the continuous passage of the needles through the successively formed folds or corrugations is greatly facilitated.

Another object of the invention is to provide means for cooperation with the needle projecting means to facilitate drawing of the tie cords by the needles through the corrugations of the material.

Another object of the invention is to provide a thoroughly practical and comparatively simple, inexpensive machine of the character mentioned which is thoroughly reliable and highly efficient in operation.

According to one practical embodiment of the invention the material corrugating means comprises cooperating endless belts having suitable material corrugating formations, and in this connection another object of the invention is to provide novel guiding and supporting means for said belts.

With the foregoing and various other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings, wherein like characters of reference denote corresponding parts in the different views:

Figure 1 is a side elevation of the present machine.

Figure 2 is a top plan view.

Figure 3 is a longitudinal section through the machine.

Figure 4 is an enlarged cross section on the line 4—4 of Figure 3.

Figure 5 is an enlarged fragmentary section through one of the material advancing and corrugating elements.

Figure 6 is a detail view showing the needles as having been advanced with the material.

Figure 7 is a view similar to Figure 6 showing the needles as having been advanced or projected through the material; and Figures 8 and 9 are fragmentary detail views showing different forms of material advancing and corrugating elements which may be employed in cases where material is to be provided with deep corrugations and where tie cords are to be passed at different levels through the material.

Referring to the drawings in detail, it will be observed that the machine, according to the particular and practical embodiment thereof illustrated in the present instance, includes a frame, designated generally as A, and that said frame is composed principally of a pair of spaced apart side members, designated as 10, 10, which are rigidly connected together by a pair of vertically spaced cross bars or beams designated as 11, 11.

Extending transversely of the machine, one forwardly and the other rearwardly of the upper cross beam 11, is a pair of shafts 12, 12 which are journaled at or near their ends in suitable bearings carried by the frame sides 10, 10 and which have fixed thereto, between the frame sides, alined sprocket wheels 13. Also extending transversely of the machine, one forwardly and the other rearwardly of the lower cross beam 11, is a second pair of shafts 14, 14 which likewise are journaled at or near their ends within suitable bearings carried by the frame sides 10, 10 and which likewise have fixed thereto, between the frame sides, alined sprocket wheels 15, 15. Preferably the shafts 12, 14 and the sprocket wheels 13, 15 carried thereby are vertically alined, respectively, but this is not essential.

Connecting each related pair of the sprocket wheels 13 is an endless chain belt 16 the upper and lower reaches of which extend, respectively, longitudinally of the machine, above and below the upper cross beam 11. Similarly, connecting each related pair of the sprocket wheels 15 is an endless chain belt 17 the upper and lower reaches of which extend, respectively, longitudinally of the machine, above and below the lower cross beam 11.

Extending from side to side of the machine across the upper belts 16 and suitably secured to said belts in suitably spaced relationship longitudinally therealong, is a number of material advancing and corrugating members 18 each in the form of a relatively thin bar or plate of suitable width or depth. Similarly, extending from side to side of the machine across the lower belts 17 and suitably secured to said lower belts in the same spaced apart relationship as the members 18, is a number of material advancing and corrugating members 19 which in all respects are duplicates of the members 18.

As will be observed by reference to Figure 1 of the drawings, the shafts 12 are connected with the shafts 14, respectively, by gears 20 whereby said shafts are required to rotate in unison and to partake of equal angular increments of movement, thus to maintain a predetermined relationship between the upper and the lower belts 16, 17 and between the members 18, 19 carried by said belts. In this connection, as will be observed by reference to Figure 3 of the drawings, the members 18 and 19 are disposed in intermeshing relationship throughout the lower and the upper reaches of the belts 16 and 17, respectively, with the members 18 extending partially into the spaces between the members 19 and the latter members extending partially into the spaces between the members 18, and with all of said members evenly spaced apart longitudinally of the machine. Thus, upon movement of the belts 16, 17 to cause their lower and upper reaches to travel from the front towards the rear of the machine, and upon feeding a sheet of material S between said reaches of said belts, it is apparent that the sheet S during its passage between said reaches will be corrugated by the members 18, 19 and will issue from between said reaches at the rear ends thereof in corrugated form, as clearly illustrated in Figure 3 of the drawings.

Depending upon the width of the machine and other considerations, any desired number of the belts 16, 17, spaced apart any desired distances transversely of the machine, may be employed to carry and to firmly support the corrugating members 18, 19. Moreover, any suitable means may be employed for fastening said members 18, 19 to the belts 16, 17. For example, some or all of the links 21 of said belts may be provided at their outer edges with laterally directed ears 22 and blocks 23 may be fastened to said links by means of rivets 24 passed through said blocks and said ears, the members 18, 19 being secured against either the front or the rear faces of said blocks by rivets or other suitable fasteners 25, all as clearly illustrated in Figures 4 and 5 of the drawings. As shown, the members 18, 19 are of greater width or depth than the blocks 23 and extend outwardly beyond said blocks, the portions of said members which extend outwardly beyond said blocks constituting the effective material corrugating portions of said members. Thus, the blocks 23 constitute gauge elements or stops to predetermine or limit the depth of the corrugations formed by the members 18, 19. Therefore, by variably spacing the members 18, 19 and by employing the members 18, 19 and blocks 23 of varying widths or depths, the depths of the corrugations produced in the material S may be varied, assuming a constant spaced relationship between the lower and the upper reaches of the belts 16, 17. On the other hand, provision may be made for corrugating the material to greater or lesser depth not only by varying the spacing and the width or depth of the members 18, 19 and the blocks 23, but by constructing the machine so that the lower and the upper reaches of the belts 16, 17 are spaced a greater or lesser distance apart.

As the belts 16, 17 operate to advance and corrugate the material S it is apparent that the material has a tendency to effect spreading apart of the lower and the upper reaches of said belts, which spreading, if permitted, not only would result in lack of uniformity in depth of the corrugations produced, but also in the imposition of undesirable stresses and strains on practically the entire machine and possibly jamming of the machine. Accordingly, means are provided not only to support the lower and the upper reaches of the belts 16, 17 against spreading or, in other words, against upward and downward deflection, respectively, but to guide said reaches and also to hold them against lateral deflection, thus to assure smooth and easy operation of the belts during their corrugating operation. As illustrated in Figures 3 and 4 of the drawings, the means mentioned comprises a track element 26 individual to the lower reach of each upper belt 16 and a track element 27 individual to the upper reach of each lower belt 17, said track elements being suitably fastened, respectively, against the under and the upper sides of the upper and lower cross beams 11, 11, respectively. Each track element is in the form of an inherently rigid metallic member of a length to extend substantially throughout the length of the related reach of the related belt and includes a rail 28 and a flange 29 spaced laterally therefrom, the rail 28 being of a width to fit neatly between the belt links 21 and the flange 29 being so spaced laterally from said rail 28 as to be engaged at one side of the belt by the heads of the pivot pins 30 by which the belt links are pivotally connected together. On the pivot pins 30 between the belt links 21 are mounted rollers 31 to roll on the rails 28. Consequently, the lower and upper reaches of the belts 16, 17 are effectively held against upward and downward deflection, respectively, and are guided for straight line movement, substantially in an antifriction manner.

At the front of the machine is suitably mounted a roller or rollers 32 or other suitable means to support and guide the sheet material S prior to its introduction between the belts 16, 17, while at a point suitably spaced rearwardly from said belts 16, 17 is a pair of rollers 33, 34 which cooperate to advance the material S following its passage between and corrugation by said belts 16, 17. The rollers 33, 34 extend transversely of the machine above and below a horizontal plane passing midway between the lower and the upper reaches of the belts 16, 17, respectively, and serve not only as a means for advancing the material as it issues from between the belts 16, 17, but to support the material in said horizontal plane at a point spaced rearwardly from its point of issue from between the belts 16, 17. As illustrated in Figures 1 and 2 of the drawings, gears 35, 36 connect the shafts on which the rollers 33, 34 are mounted whereby said rollers are rotatable in opposite directions, while as illustrated in Figures 2 and 3 of the drawings, a sprocket chain 37 connects a sprocket wheel 38 on the shaft of the upper roller 33 with a sprocket wheel 39 on a shaft 40 which extends transversely of the machine below the rear shaft 14, and which is connected with the gear wheel 20 of said shaft 14 by a gear wheel 41 whereby the rollers 33, 34 are driven in clockwise and counter-clockwise directions, respectively, as viewed in Figure 3 to effect advance of the material S. In this connection it will be noted that the sprocket wheels 38, 39 are of the same size whereby the rollers 33, 34 are rotated at the same speed as the shaft 40, and that each roller has a segmental toothed formation 42 so that for each complete revolution of said rollers the material is advanced a predetermined amount corresponding to the advance movement imparted thereto by the belts 16, 17.

Elongated needles 43 are employed for threading tie cords 44 transversely through the corrugations or folds of the material S during forming of said corrugations or folds, and, as illustrated in Figure 3 of the drawings, said needles 43 are unsupported except by the material S whereby they may continuously be projected through the corrugations of the material, counter to the direction of advance of the material, during corrugating thereof. The corrugating members 18, 19 have notches 45 opening through their free edges at points suitably spaced along said members, and said notches are alined as illustrated in Figure 4 whereby, despite the overlapping relationship of the free edge portions of said members 18, 19, the needles 43 may be passed through the corrugations of the material confined between the lower and upper reaches of the belts 16, 17. Needles may be passed through all or only some of the notches 45, depending upon the number of tie cords desired, and insertion of the needles initially is effected manually after a sufficient length of the material has been corrugated by the members 18, 19 to extend, for example, to and between the rollers 33, 34 or any suitable distance between the lower and the upper reaches of the belts 16, 17. In other words, assuming a driving connection between any suitable source of power and any one of the shafts 12 or 14, and assuming initial operation of the machine over a sufficient period of time to effect advance and corrugating of any suitable length of the material, the operation of the machine is temporarily halted and the needles, previously threaded, are inserted between the rollers 33, 34, pointed ends towards the front of the machine, through the corrugations at the lead end of the material, said needles being accommodated, as is manifest, between the overlapping portions of the members 18, 19 by the alined notches 45 in said members. Thereafter the machine is again set into operation and advance of the needles through the progressively formed corrugations is rendered automatic by means hereinafter to be described in detail, so that the machine may continue in operation without further interruption regardless of the length of successive sheets of material S which may be fed thereto.

Referring now to the means for advancing the needles through the progressively formed corrugations or folds of the material S, it will be observed that a pair of longitudinally extending bars 46, 46 are slidably mounted at the sides of the frame A for reciprocal movement in guides 47 carried by the frame sides 10, 10, and that said bars are disposed in the horizontal plane aforementioned passing midway between the lower and the upper reaches of the belts 16, 17, respectively. Also, it will be observed that each bar 46 is connected at its forward end to the upper or free end of a related lever arm 48 and that said lever arms are fixed at their lower ends to a transverse shaft 49 journaled in the frame sides 10, 10, whereby rocking movement of said shaft and said lever arms is effective to reciprocate said bars 46. A relatively short lever arm 50 is fixed to the shaft 49 between the frame sides 10, 10 in alinement, transversely of the machine, with the lever arms 48, and has pivoted to its upper or free end the forward end of a rod 51 which rod, near its rear end, rests upon a roller 52 carried by a frame cross member 53. Connecting the lever arm 50 with the cross member 53 is a spring 54 which tends constantly to swing said lever arm 50, and consequently the lever arms 48, to their rearmost limits of movement as determined by engagement of the lever arms 48 with frame carried stops 55. Carried by the shaft 40 is a disk 56, and projecting laterally from said disk is a pin 57 which is disposed to engage the rear end of the rod 51 and to push said rod forwardly a predetermined distance once during each complete revolution of said shaft 40. Thus, during continuous operation of the machine the bars 46 are periodically moved forwardly by the pin 57 and, upon disengagement of said pin from the rod 51, are suddenly retracted or moved rearwardly by the spring 54. Pivoted to the bars 46 near their free ends are L-shaped members 58 which are connected by a cross bar 59 and which are provided with ears 60 to engage the upper edges of the bars 46 whereby the cross bar 59 normally is supported in the plane of said bars 46, the pivotal connections between the members 58 and the bars 46 permitting the cross bar 59 to be swung upwardly, as illustrated by dotted lines in Figure 1 of the drawings, to permit initial manual insertion of the needles 43 through the corrugations of the material S.

Now, in view of the foregoing, it will be apparent that as the material S is corrugated and advanced between the belts 16, 17, the needles 43 will be retracted or moved rearwardly with the advancing material, as illustrated in Figure 6, until the material engages or substantially engages a yieldable facing strip 61 carried at the forward side of the cross bar 59. In this connection the arrangement of the operating parts of the machine is such that as the rear ends of the needles 43 reach or substantially reach the cross bar 59, the pin 57 engages the rod 51 and initiates forward movement thereof, thereby initiating forward movement of the bars 46 and the cross bar 59. As a consequence the needles 43 are projected or pushed through a number of the corrugations of the material until the bar 59 reaches its limit of forward movement as determined by riding of the pin 57 downwardly away from the rear end of the rod 51, whereupon the spring 54 acts to return the cross bar 59 to its rearmost position in readiness to again be moved forwardly to again project the needles as the rear ends of the latter again reach or substantially reach the cross bar 59 as a result of their rearward movement with the material S during its continued advance. The cross bar 59 does not directly engage the rear ends of the needles 43 to effect their projection, but coacts indirectly with the needles "through" the material S. That is to say, pressure is exerted by the cross bar against the material overlying the rear ends of the needles and this pressure is transmitted through the material to the needles, as will, of course, be understood. Obviously, each time the needles are advanced they penetrate a number of newly formed folds or corrugations of the material S and the cords 44 are drawn through an equal number of previously formed folds or corrugations.

Regarding drawing of the cords 44 by the needles 43 through the corrugations or folds of the material, it is important to provide means to hold that portion of the corrugated material, immediately behind the rear ends of the needles, against being moved forwardly with the needles as the latter are projected so that upon projection of the needles the cords positively are drawn through the corrugations of the material. In this connection it will be noted that a cross bar 62 is arranged slightly to the rear of the rollers 33, 34, below the lower roller 34, and that said cross bar has a relatively wide rear face which is disposed at a downward and rearward inclination and which serves as a guide to direct the corrugated and threaded material downwardly and rearwardly after it passes between the rollers 33, 34. Also it will be noted in this connection that the cross bar 59 carries a number of laterally spaced, downwardly and rearwardly directed yieldable fingers 63 which, upon forward movement of said cross bar 59, are designed to engage that portion of the material S overlying the cross bar 62 so as to clamp said portion of the material against the latter cross bar. The fingers 63 are arranged to engage the material S prior to the cross bar 59 reaching the limit of its forward movement, and said fingers, after engaging and clamping the material, yield rearwardly as the cross bar 59 continues its forward movement. Thus, as illustrated in Figure 7, during the final portion of each forward movement of the cross bar 59 the portion of the material S immediately behind the needles 43 is clamped and held against forward movement with the needles so that the latter are caused to act to draw the tie cords 44 through the material.

Below and rearwardly of the cross bar 62 is a table 64 to receive and support the corrugated and threaded material S as it gravitates from the rollers 33, 34 over the cross bar 62, and while said table may be of any suitable construction, its top preferably is composed of a number of laterally spaced, smooth, longitudinally extending wires or equivalent elements 65 over which the material is freely slidable. Near the front and the rear of the table are transverse shafts 66, 67 on which are mounted sprocket wheels 68, 69, respectively, and over said sprocket wheels are trained endless chain belts 70 the upper reaches of which are disposed flush or substantially flush with the tops of the wires 65, while projecting outwardly from said belts 70 at suitably spaced intervals therealong are pins or the like 71 to engage the material S and move it rearwardly along the wires 65. Carried by the shaft 67 is a ratchet wheel 72, and cooperating with said ratchet wheel is a pawl 73 on a lever 74 which is pivoted on said shaft. On the shaft of the roller 34 is a crank arm 75 which is connected with the lever 74 by a rod 76. Thus, during rotation of the roller 34 the lever 74 is rocked with the result of imparting, through its pawl and ratchet connection with the shaft 66, intermittent rotation to said shaft 66 in a direction and at a rate to cause the corrugated and threaded material S to be moved rearwardly along the table 64 as rapidly as the material is corrugated and advanced rearwardly by the belts 16, 17.

After the corrugated and threaded material reaches the table 64 it may either be wound on a roller at the rear end of said table to subsequently be cut into sections of desired length, or it may be cut into sections as rapidly as delivered to the table 64. In any event, successive sheets may be fed to the machine and the machine may operate continuously to effect corrugating of the sheets and threading of the tie cords through the folds thereof, the material being delivered as a continuous corrugated sheet regardless of the number and length of the separate flat sheets fed to the machine.

As previously stated, the material S may be corrugated to greater or lesser depth by employing members 18, 19 and blocks 23 of greater or lesser depth. If the corrugations are relatively shallow only a single row of tie or binding cords passing medially through the corrugations ordinarily will be sufficient for effectively binding together the corrugations of any pad or section. On the other hand, if the corrugations are relatively deep it may be desirable to provide two or more rows of tie or binding cords extending through the corrugations at different levels to provide for a more effective tying or binding together of the corrugations. In the latter event, as illustrated in Figures 8 and 9, the corrugating members, designated as 18a, may be provided with needle accommodating notches 45a of different depths to permit superimposed rows of needles and cords to be threaded through the corrugations, Figure 8 illustrating alternate shallow and deep notches to accommodate two rows of needles, and Figure 9 illustrating successive series of three notches of progressively increasing depth to accommodate three rows of needles.

From the foregoing description considered in connection with the accompanying drawings it is believed that the construction, operation and advantages of the present machine will be clearly understood. It is pointed out, however, that while only a single, specific structural embodiment of the invention has been shown and described, the same is readily capable of modification and embodiment in various other mechanical structures within the spirit and the scope thereof as defined in the appended claims.

I claim:

1. A machine of the character described comprising means for longitudinally advancing a sheet of material and for folding the material upon itself along fold lines extending transversely of the sheet to produce a transversely corrugated sheet, said means comprising cooperating sets of endless belts arranged with adjacent reaches thereof in parallel spaced relationship to have the material pass therebetween, material corrugating members extending across and outwardly from and connecting the belts of each set at points spaced longitudinally along the belts, said members having needle accommodating notches formed therein and opening through their outer edges, threaded needles to be projected transversely through the corrugations of the sheet confined between the corrugating members of adjacent reaches of the respective sets of belts whereby the needles are unsupported except by the material so as to be operable to be advanced continuously through the corrugations to draw tie cords therethrough during the continuous advance and corrugating of the material, reciprocal means operating intermittently during continuous advance of the material and forming of the corrugations to periodically project the needles through the corrugations, and means cooperating with said needle projecting means to draw the material from the needles onto the thread.

2. A machine of the character described comprising means for longitudinally advancing a sheet of material and for folding the material upon itself along fold lines extending transversely of the sheet to produce a transversely corrugated sheet, said means comprising cooperating sets of endless belts arranged with adjacent reaches thereof in parallel spaced relationship to have the material pass therebetween, material corrugating members extending across and outwardly from and connecting the belts of each set at points spaced longitudinally along the belts, said members having needle accommodation notches therein and opening through their outer edges, needles to be projected transversely through the corrugations of the sheet confined between the corrugating members of adjacent reaches of the respective sets of belts whereby the needles are unsupported except by the material so as to be operable to be advanced continuously through the corrugations to draw tie cords therethrough during continuous advance and corrugating of the material, means for progressively forcing the needles through the corrugations of the material during continuous operation of the material advancing and corrugating means, and means separate from the material advancing and corrugating means to hold the corrugations of the material against projection with the needles.

3. A machine of the character described comprising means for longitudinally advancing a sheet of material and for folding the material upon itself along fold lines extending transversely of the sheet to produce a transversely corrugated sheet, said means comprising cooperating sets of endless belts arranged with adjacent reaches thereof in parallel spaced relationship to have the material pass therebetween, material corrugating members extending across and outwardly from and connecting the belts of each set at points spaced longitudinally along the belts, said members having needle accommodation notches therein and opening through their outer edges, needles to be projected transversely through the corrugations of the sheet confined between the corrugating members of adjacent reaches of the respective sets of belts whereby the needles are unsupported except by the material so as to be operable to be advanced continuously through the corrugations to draw tie cords therethrough during continuous advance and corrugating of the material, means for progressively forcing the needles through the corrugations of the material during continuous operation of the material advancing and corrugating means, and means separate from the material advancing and corrugating means for moving the corrugations of the material rearwardly along the needles during projection of the needles.

4. A machine of the character described comprising means for longitudinally advancing a sheet of material and for folding the material upon itself along fold lines extending transversely of the sheet to produce a transversely corrugated sheet, said means comprising cooperating sets of endless belts arranged with adjacent reaches thereof in parallel spaced relationship to have the material pass therebetween, material corrugating members extending across and outwardly from and connecting the belts of each set at points spaced longitudinally along the belts, said members having needle accommodation notches formed therein and opening through their outer edges, needles to be projected transversely through the corrugations of the sheet confined between the corrugating members for drawing tie cords through the corrugations, means for progressively projecting the needles through the corrugations during continuous operation of the material advancing and corrugating means, and means operable during projection of the needles to hold the threaded corrugations immediately to the rear of the rear ends of the needles against advance with the latter whereby during projection of the needles the tie cords are drawn through the corrugations.

5. A machine of the character described comprising means for longitudinally advancing a sheet of material and for folding the material upon itself along fold lines extending transversely of the sheet to produce a transversely corrugated sheet, said means comprising cooperating sets of endless belts arranged with adjacent reaches thereof in parallel spaced relationship to have the material pass therebetween, material corrugating members extending across and outwardly from and connecting the belts of each set at points spaced longitudinally along the belts, said members having needle accommodation notches formed therein and opening through their outer edges, needles to be projected transversely through the corrugations of the sheet confined between the corrugating members for drawing tie cords through the corrugations, means for progressively projecting the needles counter to the direction of advance of the material, means separate from the material advancing and corrugating means for advancing the material along the needles during projection of the latter, and means for holding the threaded corrugations immediately to the rear of the rear ends of the needles against advance with the latter during their projection to cause tie cords to be drawn through the corrugations.

6. A machine as set forth in claim 1 in which the needle projecting means comprises a cross bar disposed in a plane passing medially between the adjacent reaches of the belts and beyond the material outlet end of the space between said reaches, and means for periodically reciprocating said cross bar.

7. A machine as set forth in claim 3 in which the means separate from the material corrugating means for moving the corrugations rearwardly along the needles comprises a pair of cooperating rollers disposed to have the material pass therebetween and provided with toothed segments to engage and advance the material.

8. A machine as set forth in claim 4 in which the means for holding the corrugations immediately to the rear of the rear ends of the needles against projection with the needles comprises a fixed member over which the corrugations to the rear of the rear ends of the needles travel, and yieldable members carried by the needle projecting means to engage the material and clamp it against said member during each needle projecting operation of said needle projecting means.

9. A machine of the character described comprising means for longitudinally advancing a sheet of material and folding the material upon itself along fold lines extending transversely of the sheet to produce a transversely corrugated sheet, said means comprising cooperating sets of endless belts disposed in superimposed spaced relationship to have the material pass therebetween, material corrugating members extending across and connecting the belts of each set at points spaced longitudinally along the belts, said members projecting outwardly from the belts and the members of each set of belts being disposed to project between the members of the other set of belts along the adjacent reaches of the respective sets of belts, threaded needles disposed to have the advancing corrugated material impaled thereon with the needles passing transversely through the corrugations of the material, means cooperating with the needles to cause the impaled corrugations to pass over the needles onto the threads, and stop blocks carried by the belts between the material corrugating members thereof and cooperating with said members to predetermine the depth of the corrugations formed in the material.

10. A machine of the character described comprising means for longitudinally advancing a sheet of material and for folding the material upon itself along fold lines extending transversely of the sheet to produce a transversely corrugated sheet, threaded needles disposed to have the corrugations of the material impaled thereon with the needles extending transversely through the corrugations, means for periodically projecting the needles, and means cooperating with said needle projecting means to draw the material from the needles onto the threads, whereby the machine is rendered operable to continuously advance and corrugate the material and to apply tie threads transversely through the corrugations of the material.

11. A machine of the character described comprising means for longitudinally advancing a sheet of material and for folding the material upon itself along fold lines extending transversely of the sheet to produce a transversely corrugated sheet, threaded needles disposed to have the corrugations of the material impaled thereon with the needles extending transversely through the corrugations, means periodically projecting the needles counter to the direction of advance of the material and subsequently releasing the needles for advance with the material during continuous advance and corrugating of the material and means cooperating with said needle projecting means to draw the material from the needles onto the threads, whereby the machine is rendered operable to continuously advance and corrugate the material and to apply tie threads transversely through the corrugations of the material.

12. A machine of the character described comprising means for longitudinally advancing a sheet of material and for folding the material upon itself along fold lines extending transversely of the sheet to produce a transversely corrugated sheet, straight threaded needles disposed to have the corrugations of the material impaled thereon with the needles extending transversely through the corrugations, means operating through the material for holding the needles to cause the advancing corrugations to be impaled thereon, means whereby said last named means is operated periodically thus to permit the impaled corrugations to pass over the needles onto the threads, and means cooperating with said needle holding and operating means to draw the material from the needles onto the threads, whereby the machine is rendered operable to continuously advance and corrugate the material and to apply tie threads transversely through the corrugations of the material.

13. A machine of the character described comprising means for longitudinally advancing a sheet of material and for folding the material upon itself along fold lines extending transversely of the sheet to produce a transversely corrugated sheet, straight needles disposed to have the corrugations of the material impaled thereon with the needles extending transversely through the corrugations, means operating through the material adjacent to the threaded ends of the needles for holding the needles to cause the advancing corrugations to be impaled thereon, means whereby said last named means is operated periodically thus to permit the impaled corrugations to pass over the needles onto the threads, and means cooperating with said needle holding and operating means to draw the material from the needles onto the threads, whereby the machine is rendered operable to continuously advance and corrugate the material and to apply tie threads transversely through the corrugations of the material.

14. A machine as set forth in claim 9 in which the stop blocks are fastened to the belts and in which the material corrugating members are fastened to said stop blocks.

15. A machine as set forth in claim 10 including reciprocal means for periodically projecting the needles.

16. A machine as set forth in claim 10 including means separate from the material advancing and corrugating means to hold the corrugations immediately to the rear of the material advancing and corrugating means against projection with the needles.

17. A machine as set forth in claim 10 including means separate from the material advancing and corrugating means for moving the corrugations of the material rearwardly along the needles during projection of the needles.

18. A machine as set forth in claim 10 in which the means for drawing the corrugations of the material from the needles onto the threads serves to clamp the threaded corrugations immediately to the rear of the needles against projection with the needles.

19. A machine as set forth in claim 10 including means separate from the material advancing and corrugating means for moving the corrugations of the material rearwardly along the needles during projection of the needles, and in which the means for drawing the corrugations of the material from the needles onto the threads serves to hold the threaded corrugations immediately to the rear of the needles against projection with the needles.

20. A machine as set forth in claim 10 including a reciprocal member to project the needles, a support across which the threaded corrugations of the material travel, and resilient means carried by said reciprocal member for cooperation with said support to clamp and hold the threaded corrugations immediately adjacent to the rear ends of the needles during projection of the needles.

21. A machine of the character described comprising means for longitudinally advancing a sheet of material and for folding the material upon itself along fold lines extending transversely of the sheet to produce a transversely corrugated sheet, a straight threaded needle disposed to have the corrugations of the material impaled thereon with the needle extending transversely through the corrugations, and means separate from the material advancing and corrugating means for positively moving the material from the needle onto the thread.

22. A machine of the character described comprising means for longitudinally advancing a sheet of material and for folding the material upon itself along fold lines extending transversely of the sheet to produce a transversely corrugated sheet, a straight threaded needle disposed to have the corrugations of the material impaled thereon with the needle extending transversely through the corrugations, means to hold the needle to cause the advancing corrugations to be impaled thereon, and means operating periodically in cooperation with said holding means for positively moving the material from the needle onto the thread.

JOHN P. MORRIS.